United States Patent
Prior

(10) Patent No.: US 12,304,288 B2
(45) Date of Patent: May 20, 2025

(54) SEALING SYSTEM FOR VEHICLE CLOSURE SYSTEM

(71) Applicant: Ford Global Technologies, LLC, Dearborn, MI (US)

(72) Inventor: Joseph Prior, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 18/332,799

(22) Filed: Jun. 12, 2023

(65) Prior Publication Data

US 2024/0408949 A1   Dec. 12, 2024

(51) Int. Cl.
  *B60J 10/86*   (2016.01)
  *B60J 5/10*   (2006.01)

(52) U.S. Cl.
  CPC ........... *B60J 10/86* (2016.02); *B60J 5/10* (2013.01)

(58) Field of Classification Search
  CPC ..... B60J 10/86; B60J 5/10; B60J 5/103; B60J 5/105
  See application file for complete search history.

(56) References Cited

U.S. PATENT DOCUMENTS

| | | |
|---|---|---|
| 2,681,819 A | 6/1954 | Burke |
| 2,926,943 A | 3/1960 | Leslie et al. |
| 2,936,195 A * | 5/1960 | Schutte ............... B60J 5/101 296/106 |
| 3,082,033 A | 3/1963 | Bosher |
| 3,128,120 A | 4/1964 | Fournier et al. |
| 4,699,197 A | 10/1987 | Hamrick et al. |
| 6,123,386 A * | 9/2000 | Montone ............... B60J 5/105 292/336.3 |
| 7,488,029 B2 | 2/2009 | Lechkun et al. |
| 7,845,712 B2 | 12/2010 | Gordon et al. |
| 8,020,912 B2 | 9/2011 | Lounds |
| 9,676,258 B2 | 6/2017 | Warburton et al. |
| 12,077,038 B2 * | 9/2024 | Delay ............... E05F 15/686 |
| 2017/0342767 A1 * | 11/2017 | Sakakibara ........... B60J 5/0479 |
| 2020/0308882 A1 * | 10/2020 | Salter ............... E05B 81/08 |
| 2022/0120117 A1 | 4/2022 | Ottino et al. |

FOREIGN PATENT DOCUMENTS

| | | | |
|---|---|---|---|
| EP | 1060926 A2 | 12/2000 | |
| EP | 1 428 709 | * 6/2004 | |
| EP | 1524369 A3 | 11/2005 | |
| EP | 1637674 A1 | 3/2006 | |
| EP | 1065083 B1 | 1/2007 | |
| GB | 2565109 | * 2/2019 | ........... B60J 10/244 |

* cited by examiner

*Primary Examiner* — Gregory J Strimbu
(74) *Attorney, Agent, or Firm* — Vichit Chea; Carlson, Gaskey & Olds, P.C.

(57) ABSTRACT

A closure system, includes a first closure module pivotable between a first closure closed position and a first closure open position, and a second closure module pivotable between a second closure closed position and a second closure open position. A sealing system that seals an interface between the first closure module and the second closure module when the first closure module is in the first closure closed position and the second closure module is in the second closure closed position.

18 Claims, 6 Drawing Sheets

SEALING SYSTEM FOR VEHICLE CLOSURE SYSTEM

TECHNICAL FIELD

This disclosure relates generally to a sealing system and, more particularly, to a sealing system that seals an interface between closure modules of a closure system.

BACKGROUND

Vehicles can include various closure systems, such as doors and tailgates. Some closure systems include an upper closure module and a lower closure module that can each pivot to an open position. When the upper and lower closure modules are closed, an interface between the upper and lower closure modules is sealed. To this end, the upper and lower closure modules are shingled such that the upper closure module needs to be opened before the lower closure module can be opened, or vice versa.

SUMMARY

In some aspects, the techniques described herein relate to a closure system, including: a first closure module pivotable between a first closure closed position and a first closure open position; a second closure module pivotable between a second closure closed position and a second closure open position; and a sealing system that seals an interface between the first closure module and the second closure module when the first closure module is in the first closure closed position and the second closure module is in the second closure closed position, the sealing system permitting movement of the first closure module back-and-forth between the first closure closed position and the first closure open position when the second closure module is in the second closure closed position, the sealing system permitting movement of the second closure module back-and-forth between the second closure open position and the second closure closed position when the first closure module is in the first closure closed position.

In some aspects, the techniques described herein relate to a closure system, wherein the first closure module and the second closure module are modules of a tailgate assembly at an aft end of a vehicle.

In some aspects, the techniques described herein relate to a closure system, wherein the first closure module is configured to pivot about a horizontally extending axis between the first closure closed position and the first closure open position, wherein the second closure module is configured to pivot about a second horizontal axis between the second closure closed position and the second closure open position In some aspects, the techniques described herein relate to a closure system, wherein the first closure module is configured to pivot about a horizontally extending axis between the first closure closed position and the first closure open position, wherein the second closure module is configured to pivot about a vertically extending axis between the second closure closed position and the second closure open position.

In some aspects, the techniques described herein relate to a closure system, wherein the first closure module is disposed vertically above the second closure module.

In some aspects, the techniques described herein relate to a closure system, wherein the first closure module is a flip glass, and the second closure module is a swing gate.

In some aspects, the techniques described herein relate to a closure system, wherein the sealing system includes a seal that is sandwiched between a pivotable flap of the first closure module and a flange of the second closure module.

In some aspects, the techniques described herein relate to a closure system, wherein the seal is a bulb seal.

In some aspects, the techniques described herein relate to a closure system, wherein the seal is mounted to the flange.

In some aspects, the techniques described herein relate to a closure system, wherein the pivotable flap is pivotable from a sealing position with the flange to a releasing position with the flange.

In some aspects, the techniques described herein relate to a closure system, wherein the pivotable flap is shingled behind the flange when the pivotable flap is in the sealing position.

In some aspects, the techniques described herein relate to a closure system, wherein the pivotable flap in the sealing position blocks movement of the first closure module from the first closure closed position, wherein the pivotable flap in the releasing position permits pivoting movement of the first closure module between from the first closure closed position to the first closure open position when the second closure module is in the second closure closed position.

In some aspects, the techniques described herein relate to a closure system, further including at least one guide pin received within a guide track to guide movement of the pivotable flap back-and-forth between the sealing position and the releasing position.

In some aspects, the techniques described herein relate to a closure system, further including at least one biasing member that biases the pivotable flap to the releasing position.

In some aspects, the techniques described herein relate to a closure interface sealing method, including: pivoting a first closure module of a closure system from a first closure open position to a first closure closed position; during the pivoting, maintaining a second closure module in a second closure closed position; and during the pivoting, guiding a pivotable flap of the first closure module from a releasing position to a sealing position with a flange of the second closure module, the pivotable flap shingled with the flange when the pivotable flap is in the sealing position.

In some aspects, the techniques described herein relate to a closure interface sealing method, wherein the closure system is a tailgate assembly of a vehicle.

In some aspects, the techniques described herein relate to a closure interface sealing method, further including compressing a seal between the flange and the pivotable flap when the pivotable flap is in the sealing position.

In some aspects, the techniques described herein relate to a closure interface sealing method, wherein the first closure module is pivotable back-and-forth between the first closure closed position and the first closure open position when the second closure module is in the second closure closed position, wherein the second closure module is pivotable back-and-forth between a second closure open position and the second closure closed position when the first closure module is in the first closure closed position.

In some aspects, the techniques described herein relate to a closure interface sealing method, further including biasing the pivotable flap to the releasing position.

In some aspects, the techniques described herein relate to a closure interface sealing method, wherein, when the first closure module is in the first closure closed position and the second closure module is in the second closure closed position, the pivotable flap vertically overlaps with the flange.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary closure systems for a vehicle. The closure systems can be a tailgates or "split" tailgates of the vehicle. The closure systems can include first and second closure modules that are independently pivotable between closed and open positions relative to each other. In particular, the disclosure details exemplary sealing systems that seal an interface between the first and second closure modules when the first and second closure modules are in closed positions.

Figure 1:
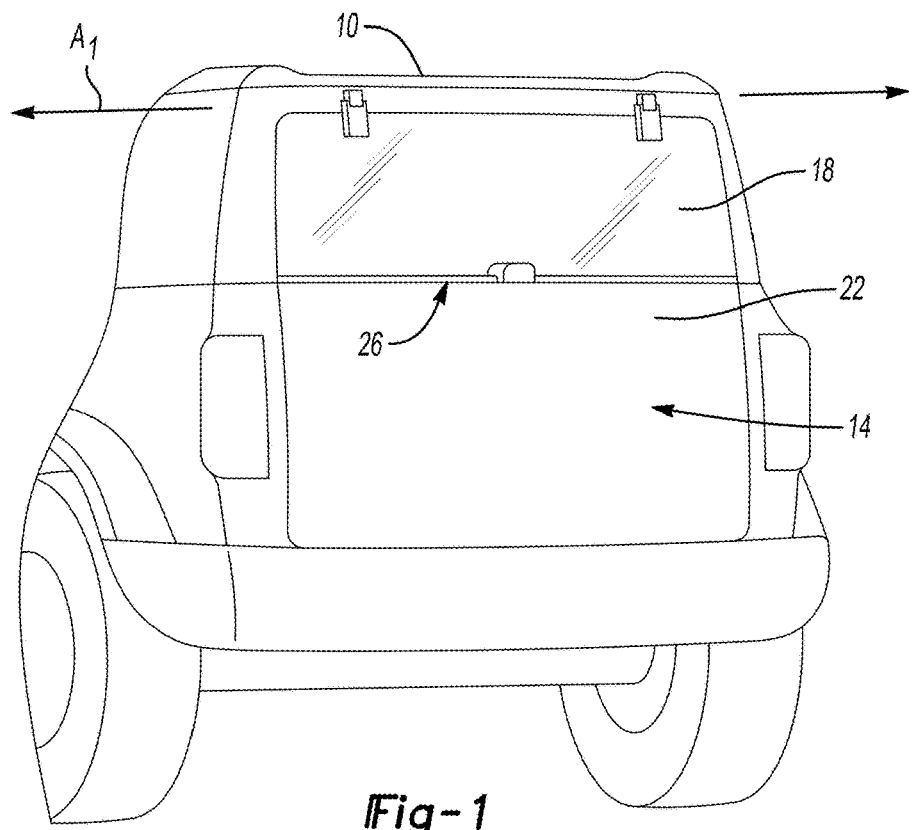
FIG. 1 illustrates an exemplary embodiment of a closure system having a first closure module and a second closure modules in closed positions.

With reference to FIG. 1, a vehicle 10 includes a closure system 14. In this example, the closure system 14 is a tailgate assembly disposed at an aft end of the vehicle 10. The tailgate assembly may be considered a two-part or "split" tailgate assembly. In another example, the closure system could be a door, for example.

The closure system 14 includes a first closure module 18 and a second closure module 22. The first closure module 18 is disposed vertically above the second closure module 22. Vertical, aft, and forward are with reference to a general orientation of the vehicle 10 during ordinary operation. In this example, the first closure module 18 is a flip glass, and the second closure module 22 is a swing gate.

Figure 2:
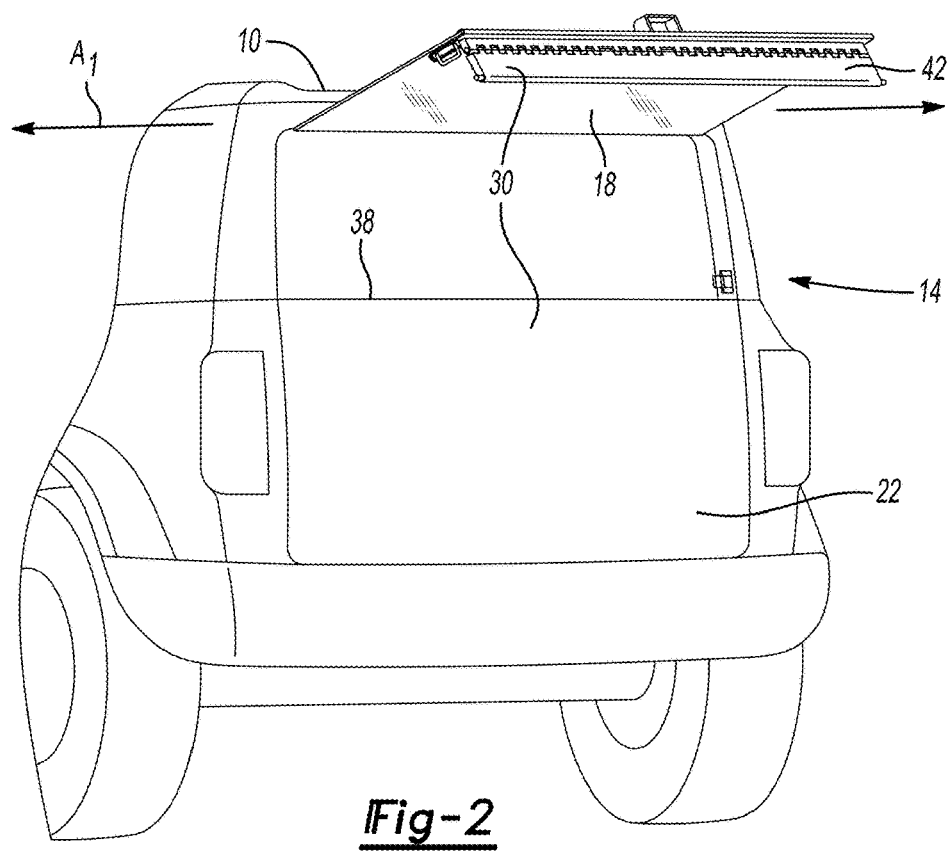
FIG. 2 illustrates the closure system of FIG. 1 with the first closure module pivoted about a horizontally extending axis from the closed position to an open position.

In this example, the first closure module 18 can pivot back-and-forth about a horizontally extending axis A1 from a first closure closed position shown in FIG. 1 to a first closure open position shown in FIG. 2. The second closure module 22 can remain in a second closure closed position when the first closure module 18 is pivoted about the axis A1.

Figure 3:
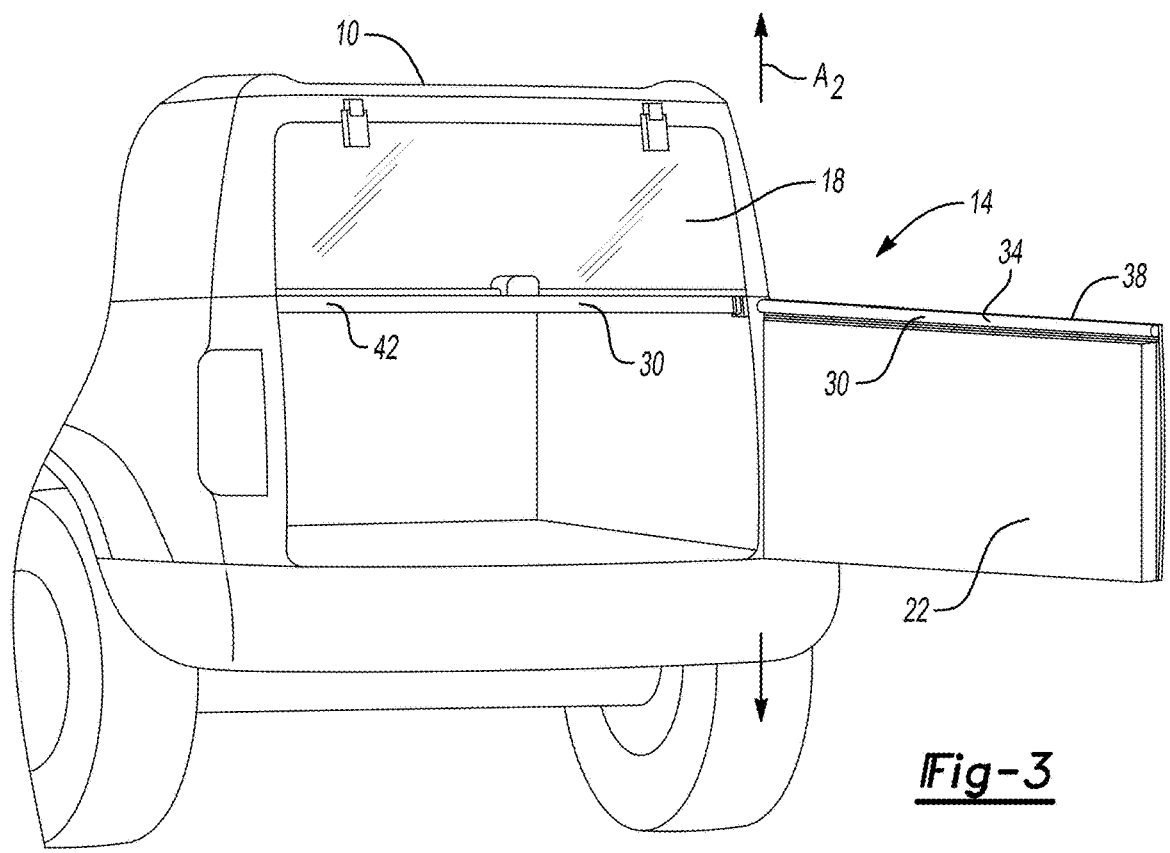
FIG. 3 illustrates the closure system of FIG. 1 with the second closure module pivoted about a vertically extending axis from the closed position an open position.

When the first closure module 18 is in the first closure closed position, the second closure module can be pivoted back-and-forth about a vertically extending axis A2 from the second closure closed position to a second closure open position shown in FIG. 3.

In another example, as shown in FIG. 3B, the second closure module 22 could be pivoted to the second closure open position about a horizontally extending axis A2' while the first closure module 18 is in the first closure closed position.

When the first closure module 18 and the second closure module 22 are in respective closed positions, the first closure module 18 and the second closure module 22 meet at an interface 26. Sealing the interface 26 may be necessary to prevent, among other things, moisture, wind, and contaminants from entering the vehicle 10 between the first closure module 18 and the second closure module 22.

Figure 4:
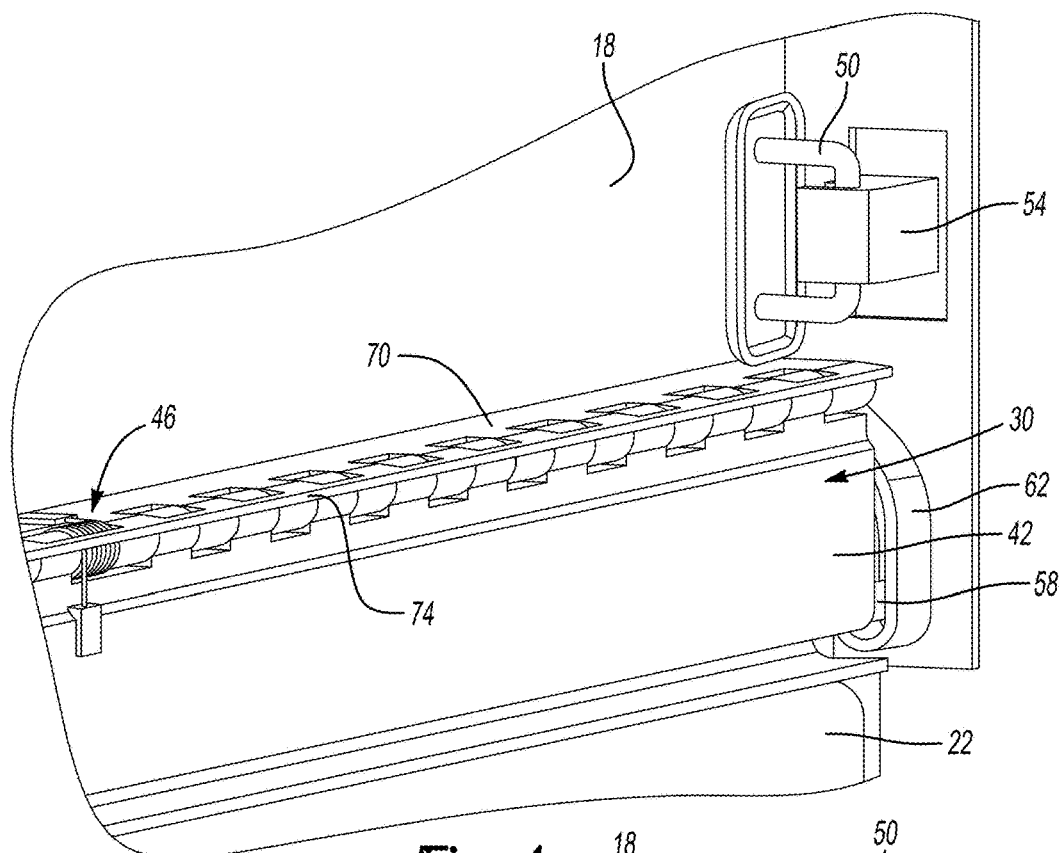
FIG. 4 illustrates a portion of the closure system of FIG. 1 when viewed from within the vehicle.
Figure 5:
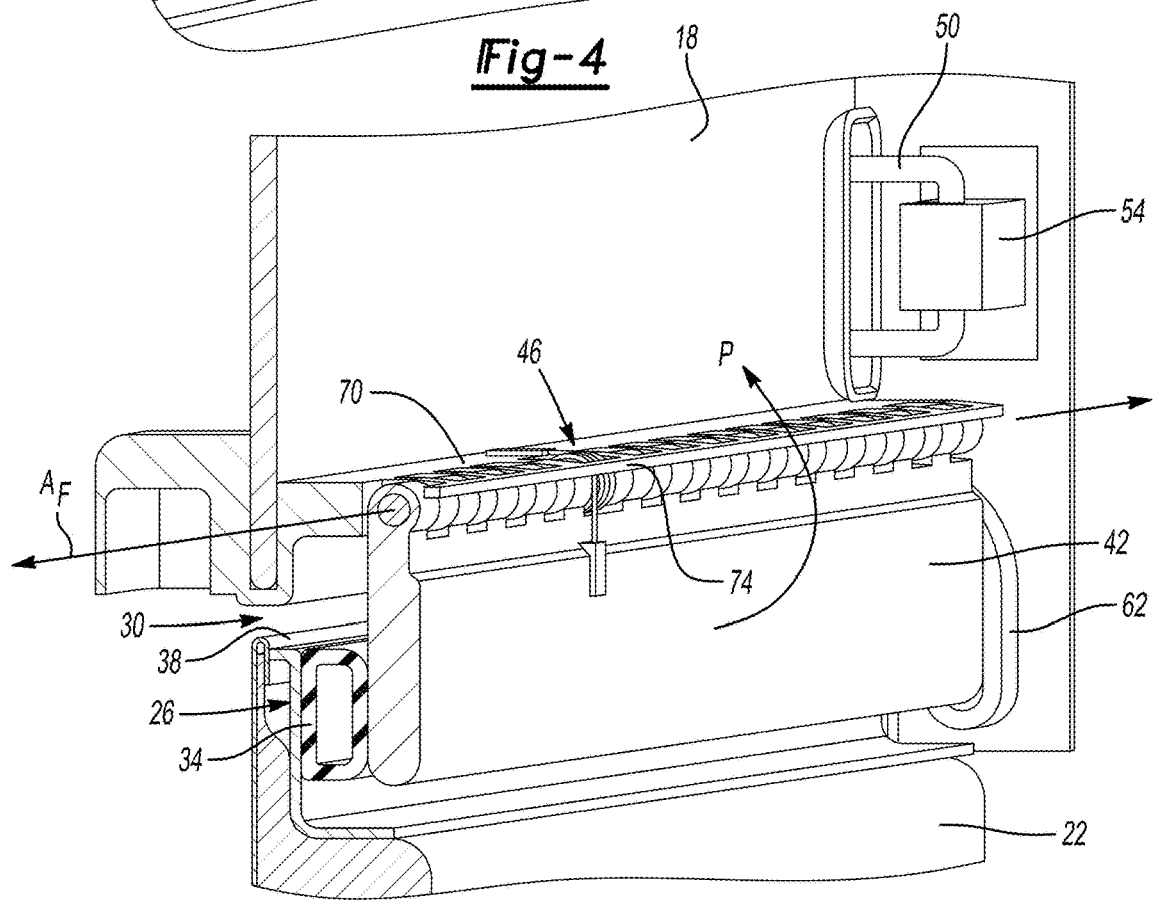
FIG. 5 illustrates a section view through the portion of the closure system shown in FIG. 4.

With reference now to FIGS. 4 and 5 and continuing reference to FIGS. 1-3, a sealing system 30 is used to seal the interface 26 when the first closure module 18 and the second closure module 22 are in respective closed positions. Notably, the sealing system 30 permits movement of the first closure module 18 to an open position while the second closure module 22 remains in a closed position. The sealing system 30 further permits movement of the second closure module 22 to the open position while the first closure module 18 remains in the closed position.

The sealing system includes a seal 34, a flange 38, and a pivotable flap 42. The seal 34 is compressed between the flange 38 and the pivotable flap 42 to seal the interface 26. In this example, the seal 34 is a bulb seal that is mounted to the flange 38.

In this example, the flange 38 extends vertically upward from the second closure module 22, and the pivotable flap 42 is part of the first closure module 18. In another example, the flange 38 could be part of the first closure module 18, and the pivotable flap 42 part of the second closure module.

Figure 3A:
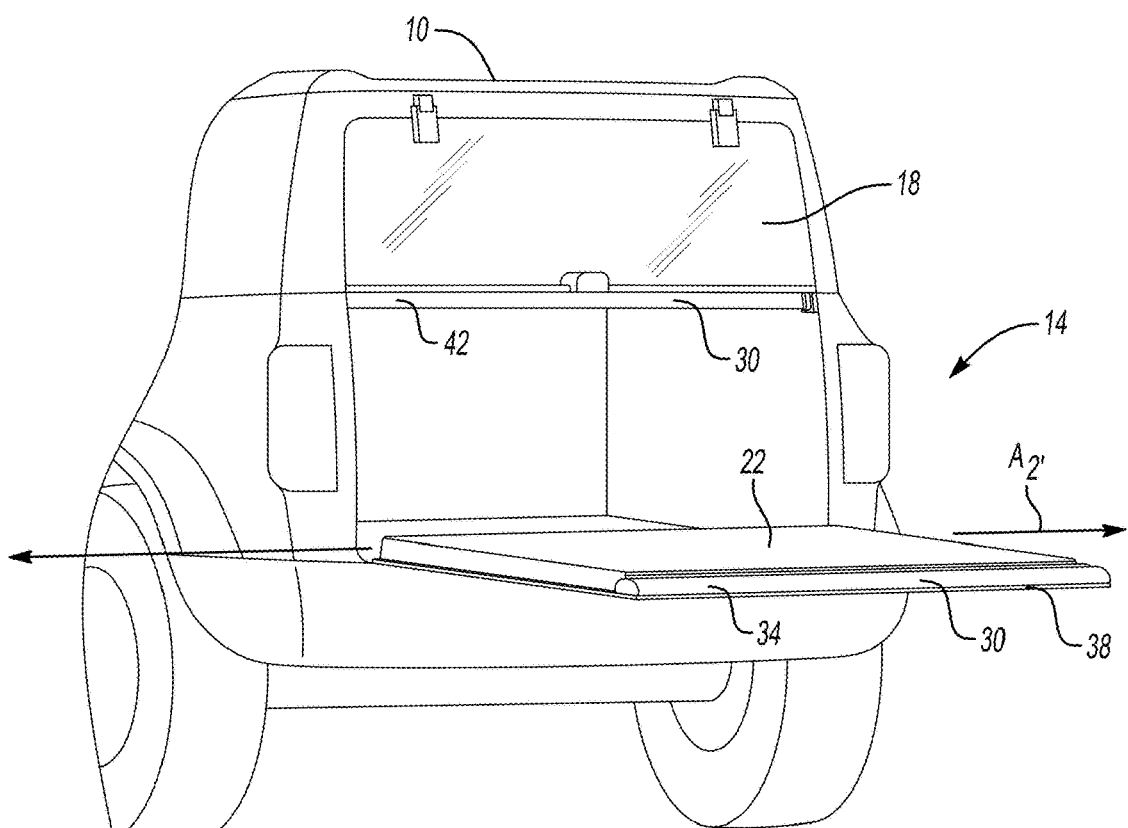
FIG. 3A illustrates a variation of the closure system of FIG. 1 with a second closure module pivoted about a horizontally extending axis to an open position.

When the pivotable flap 42 is in a sealing position as shown in FIG. 5, the seal 34 is sandwiched between the pivotable flap 42 and the flange 38, which compresses the seal 34 to seal the interface 26. When the pivotable flap 42 is in a sealing position as shown in FIG. 5, the pivotable flap 42 is shingled with the flange 38. The flange 38 is aft the pivotable flap 42 as shown in FIG. 5. Thus, the second closure module 22 can pivot from the closed position of FIG. 5 to the open position of FIG. 3A without being blocked by the pivotable flap 42.

Because the flange 38 is aft the pivotable flap 42, the pivotable flap 42 needs to be repositioned to move the first closure module 18 from the closed position of FIG. 1 to the open position of FIG. 2. The pivotable flap 42, if not repositioned, will block pivoting movements of the first closure module 18.

Figure 6:
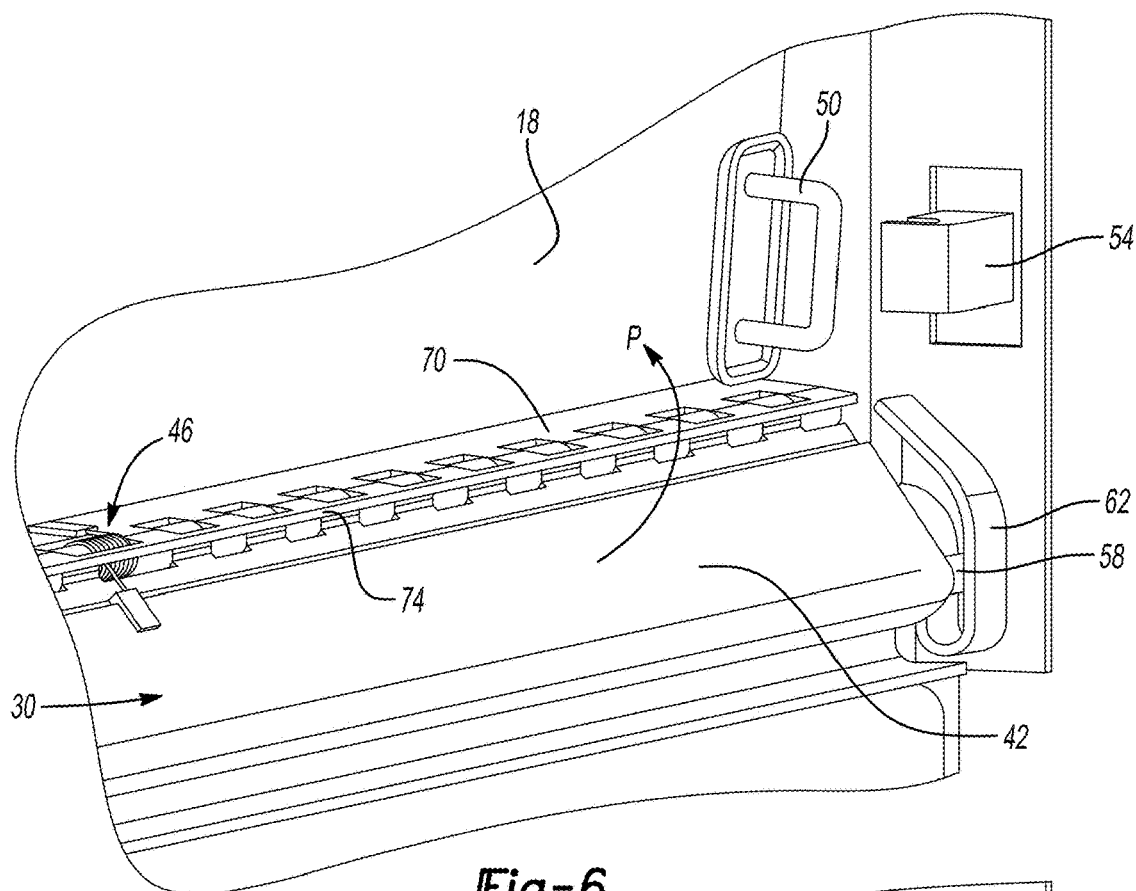
FIG. 6 illustrates the portion of the closure system in FIG. 4 as the first closure module is pivoted toward the open position of FIG. 2 while the second closure module remains in the closed position.
Figure 7:
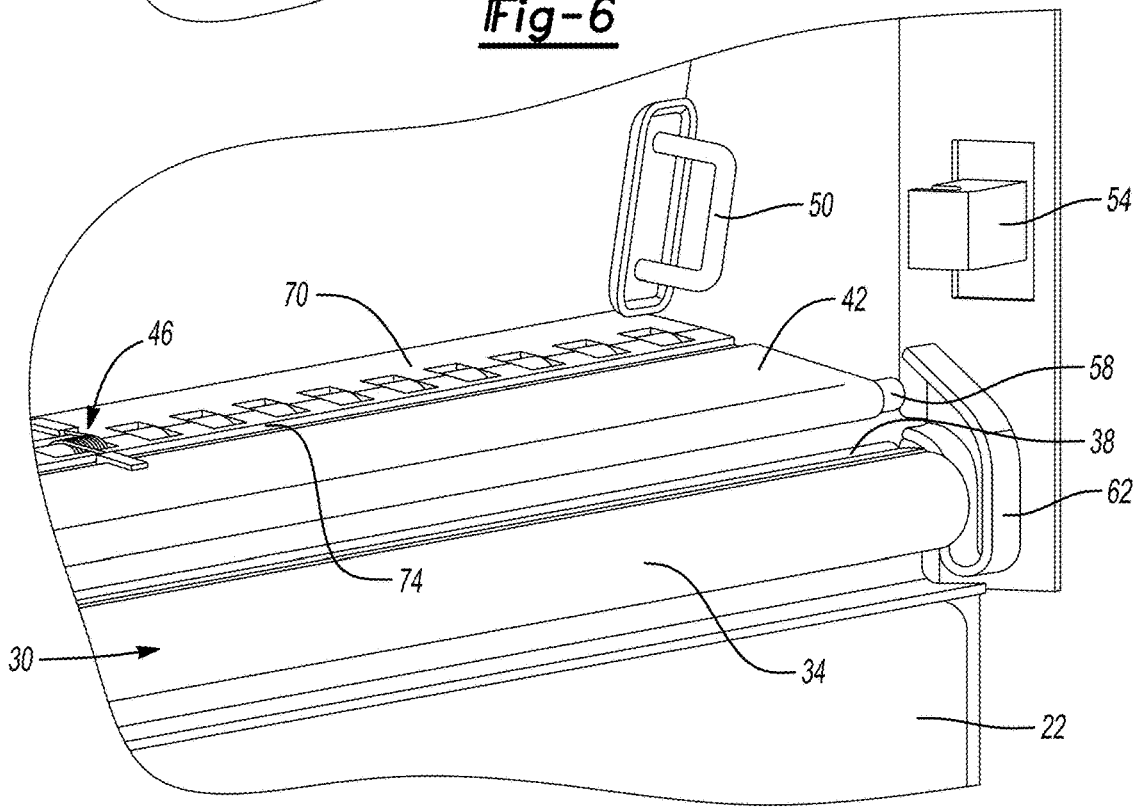
FIG. 7 illustrates the portion of the closure system of FIG. 6 when the first closure module is pivoted closer to the open position of FIG. 2.

The pivotable flap 42 is thus pivotable from the sealing position of FIGS. 4 and 5 to the position of FIG. 6 and then to the releasing position of FIG. 7. In this example, a plurality of springs 46 act as biasing members to bias the pivotable flap 42 to the releasing position. In the releasing position, the pivotable flap 42 is elevated above the flange 38 enabling the first closure module 18 to move to the open position of FIG. 2.

To initiate movement of the first closure module 18 from the position of FIGS. 1, 4, and 5 to the open position of FIG. 2, a user can unlatch a striker 50 from a catch 54. A lift assist (not shown) can then cause the first closure module 18 to pivot from the closed position to the position of FIG. 6. As the first closure module 18 pivots from the position of FIG. 4 to the position of FIG. 6, the springs 46 cause the pivotable flap 42 to pivot in a direction P from a position where the pivotable flap 42 is shingled with the flange 38.

In this example, a guide pin 58 extending from and outboard side of the pivotable flap 42 is received within a guide track 62 to guide pivoting movement of the pivotable flap 42 from the sealing position of FIG. 4 to the position of FIG. 6. The guide pin 58 being received within the guide track 62 direct and reorient the pivotable flap 42 as the first closure module 18 is pivoted.

One guide pin 58 is used in this example. In other examples, another guide pin extending from the other outboard side of the pivotable flap 42 could be received within a respective track so that opposing outboard sides of the pivotable flap 42 can both be guided by guide pins received within tracks.

As the first closure module 18 continues to pivot further from the closed position, the guide pin 58 slides within the guide track 62 until exiting the guide track 62 as shown in FIG. 7. At this point, the pivotable flap 42 has been rotated by the springs 46 to a position where the pivotable flap 42 is vertically elevated above the flange 38. The first closure module 18 can then continue to pivot from the closed position to a fully open position without the pivotable flap 42 being blocked by the flange 38. The springs 46 maintain the position of the pivotable flap 42 when the guide pin 58 is not received within the guide track 62.

Figure 8:
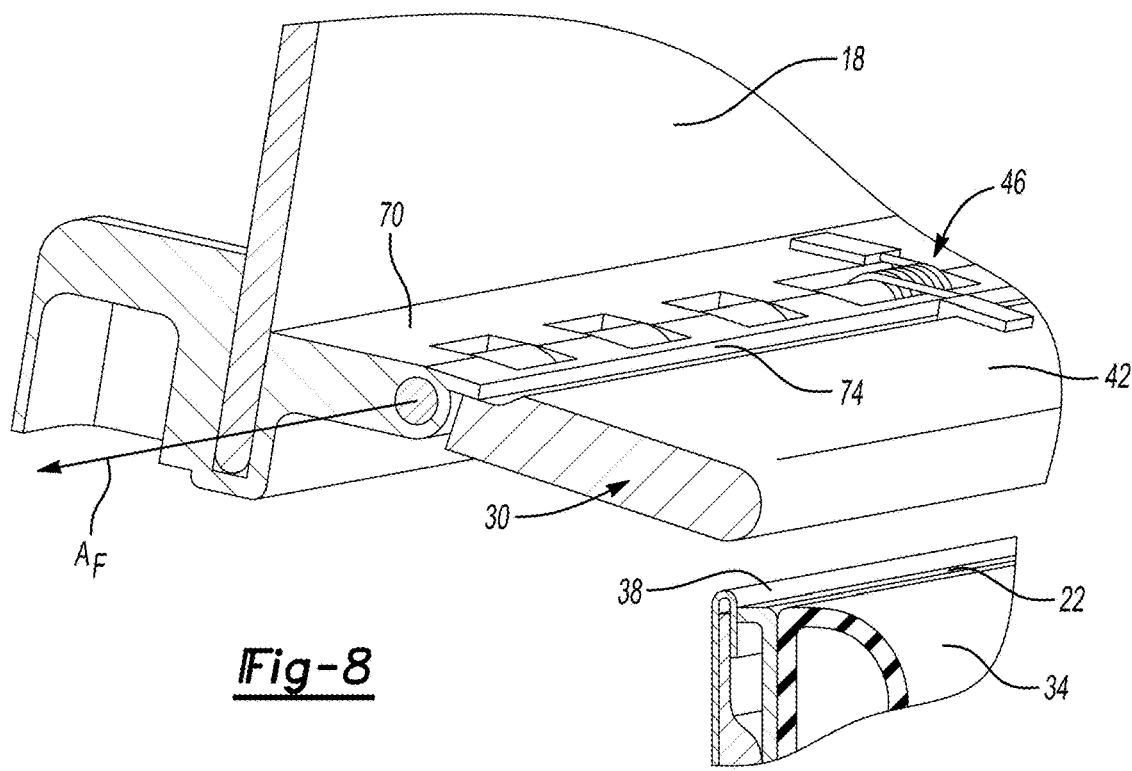
FIG. 8 illustrates a section view through the portion of the closure system when the first closure module is in the position of FIG. 7.

The pivotable flap 42 of the first closure module 18 pivots about an axis $A_F$ relative to a housing 70 of the first closure module 18. The housing 70 incorporates a limiting flange 74 that blocks pivoting movement of the pivotable flap 42 in the direction P past a position shown in FIGS. 7 and 8.

Figure 9:
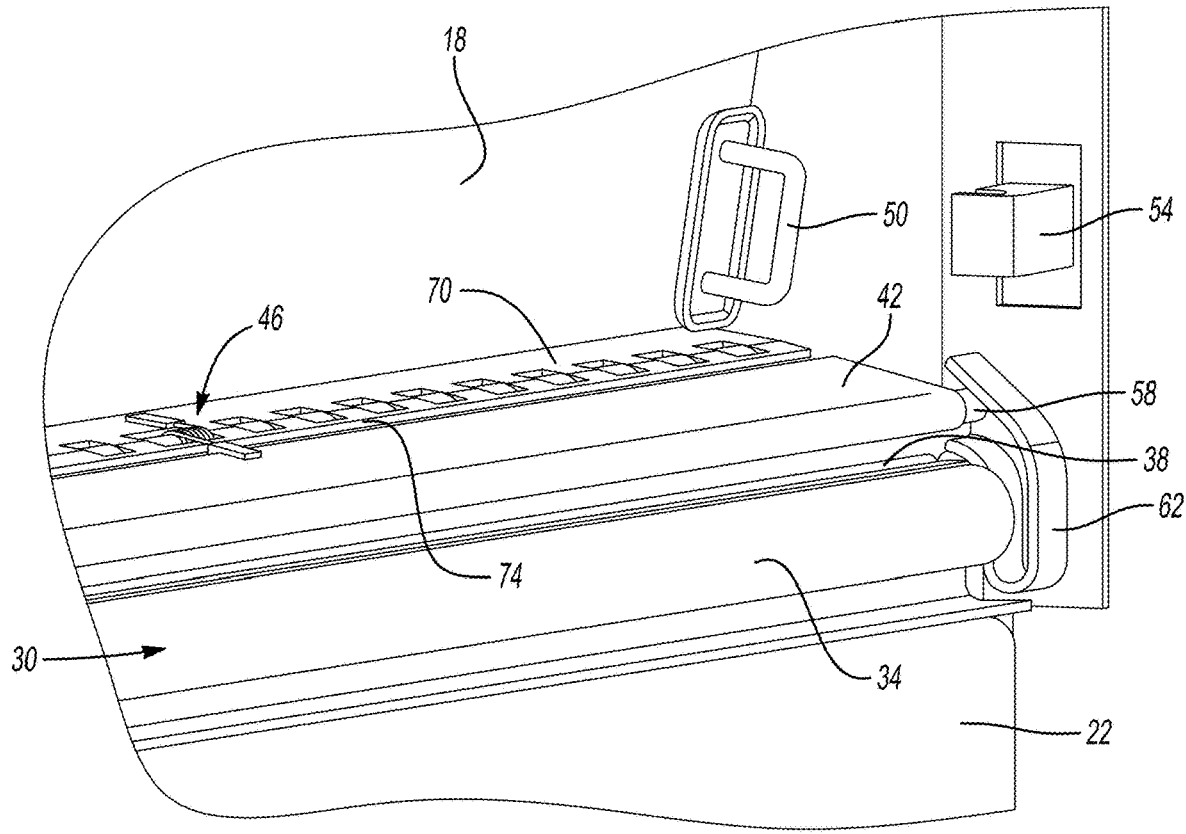
FIG. 9 illustrates the portion of the closure system of FIG. 7 when the first closure module is pivoting back to the closed position.
Figure 10:
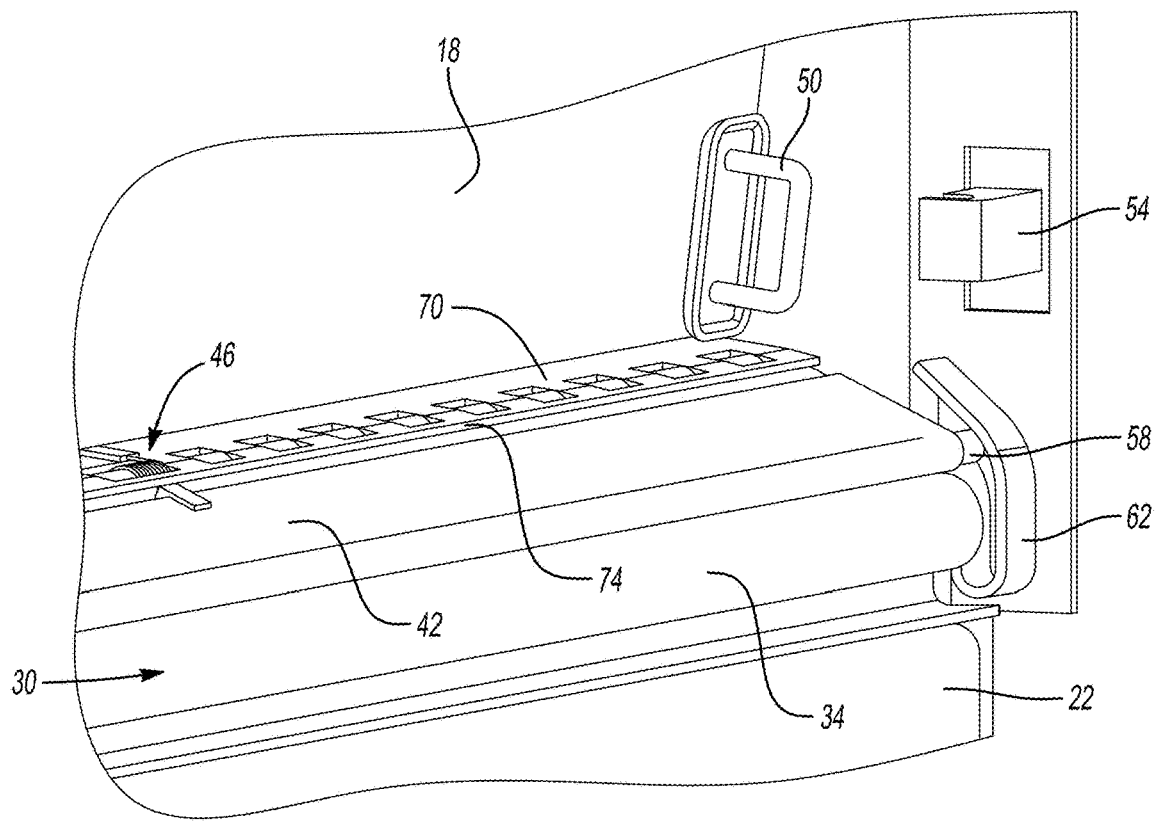
FIG. 10 illustrates the portion of the closure system of FIG. 9 when the first closure module is pivoted from the open position of FIG. 2 toward the closed position of FIG. 1.
Figure 11:
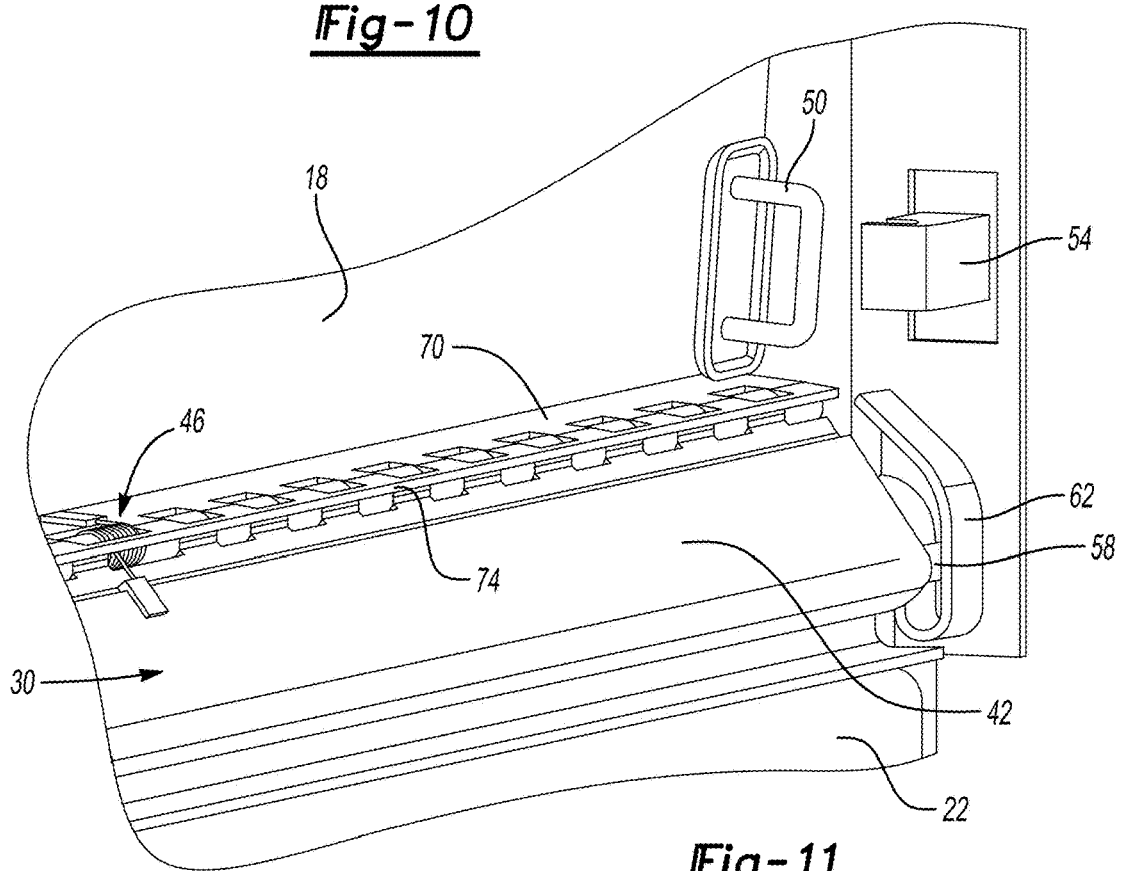
FIG. 11 illustrates the section of the closure system of FIG. 10 when the first closure module is pivoted from the position of FIG. 10 closer to the closed position of FIG. 1.

If closing the first closure module 18 is desired, the first closure module 18 can be pivoted to the position of FIG. 9 where the guide pin 58 enter the guide track 62. Continued pivoting of the first closure module 18 toward the closed position slides the guide pin 58 further into the guide track 62. Contact between the guide pin 58 and the guide track 62 causes the pivotable flap 42 to pivot in a direction oppose the direction P as shown in FIGS. 10 and 11 until the pivotable flap 42 is again shingled behind the flange 38 as shown in FIG. 5. In this position, the first closure module 18 is in the closed position.

Features of this disclosure include a closure system having upper and lower closure modules that can each be opened while the other is closed.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A closure system, comprising:
a first closure module pivotable between a first closure closed position and a first closure open position;
a second closure module pivotable between a second closure closed position and a second closure open position; and
a sealing system that seals an interface between the first closure module and the second closure module when the first closure module is in the first closure closed position and the second closure module is in the second closure closed position,
the sealing system permitting movement of the first closure module back-and-forth between the first closure closed position and the first closure open position when the second closure module is in the second closure closed position,
the sealing system permitting movement of the second closure module back-and-forth between the second closure open position and the second closure closed position when the first closure module is in the first closure closed position,
wherein the sealing system includes a flap pivotally mounted on the first closure module and a seal mounted on the second closure module, wherein the flap is selectively engageable with the seal,
wherein at least one of the first closure module and the second closure module is pivotable about a horizontal axis,
wherein the first closure module and the second closure module are modules of a tailgate assembly at an aft end of a vehicle.

2. The closure system of claim 1, wherein the at least one of the first closure module and the second closure module comprises the first closure module which is configured to pivot about the horizontal axis between the first closure closed position and the first closure open position, wherein the second closure module is configured to pivot about a second horizontal axis between the second closure closed position and the second closure open position.

3. The closure system of claim 1, wherein the at least one of the first closure module and the second closure module comprises the first closure module which is configured to pivot about the horizontal axis between the first closure closed position and the first closure open position, wherein the second closure module is configured to pivot about a vertically extending axis between the second closure closed position and the second closure open position.

4. The closure system of claim 1, wherein the first closure module is disposed vertically above the second closure module.

5. The closure system of claim 1, wherein the first closure module is a flip glass, and the second closure module is a swing gate.

6. The closure system of claim 1, wherein the seal is a bulb seal.

7. The closure system of claim 1, wherein the seal is mounted to a flange of the second closure module.

8. The closure system of claim 1, wherein the flap is pivotable between a sealing position and a releasing position.

9. The closure system of claim 8, wherein the flap is shingled behind a flange of the second closure module when the flap is in the sealing position and the second closure module is in the second closure closed position.

10. The closure system of claim 8, wherein the flap in the sealing position blocks movement of the first closure module from the first closure closed position when the second closure module is in the second closure closed position, wherein the flap in the releasing position permits pivoting movement of the first closure module from the first closure closed position to the first closure open position when the second closure module is in the second closure closed position.

11. The closure system of claim 8, further comprising at least one guide pin received within a guide track to guide movement of the flap back-and-forth between the sealing position and the releasing position.

12. The closure system of claim 8, further comprising at least one biasing member that biases the flap toward the releasing position.

13. A closure system, comprising:
a first closure module pivotable between a first closure closed position and a first closure open position;
a second closure module pivotable between a second closure closed position and a second closure open position; and
a sealing system having a seal that seals an interface between the first closure module and the second closure module when the first closure module is in the first closure closed position and the second closure module is in the second closure closed position,
the sealing system permitting movement of the first closure module back-and-forth between the first closure closed position and the first closure open position when the second closure module is in the second closure closed position,
the sealing system permitting movement of the second closure module back-and-forth between the second closure open position and the second closure closed position when the first closure module is in the first closure closed position,
wherein the sealing system includes a flap pivotally mounted on the first closure module and the seal is mounted on the second closure module, wherein the flap is selectively engageable with the seal,
wherein at least one of the first closure module and the second closure module is pivotable about a horizontal axis,
wherein the first closure module and the second closure module are modules of a tailgate assembly at an aft end of a vehicle.

14. The closure system of claim 13, wherein the flap is positionable in a sealed position such that the seal is sandwiched between the flap of the first closure module and a flange of the second closure module.

15. The closure system of claim 14, wherein movement of the first closure module relative to the second closure module causes the flap to transition from the sealed position to an unsealed position.

16. The closure system of claim 14, wherein the seal is compressed horizontally between the flap and the flange when the flap is in the sealed position.

17. The closure system of claim 14, wherein the seal is mounted to the flange.

18. The closure system of claim 14, wherein the flap is shingled behind the flange when the flap is in the sealed position and the second closure module is in the second closure closed position, wherein the flap is pivotable from the sealed position to a releasing position, and further comprising at least one biasing member that biases the flap toward the releasing position.

* * * * *